US012261296B2

(12) United States Patent
Yamaguchi et al.

(10) Patent No.: US 12,261,296 B2
(45) **Date of Patent: *Mar. 25, 2025**

(54) ACTIVE MATERIAL

(71) Applicant: TOYOTA JIDOSHA KABUSHIKI KAISHA, Toyota (JP)

(72) Inventors: Hiroyuki Yamaguchi, Toyota (JP); Hironori Daikoku, Susono (JP); Jun Yoshida, Mishima (JP); Kazuhiro Suzuki, Hadano (JP); Mitsutoshi Otaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,271

(22) Filed: Dec. 29, 2023

(65) Prior Publication Data

US 2024/0136522 A1 Apr. 25, 2024
US 2024/0234721 A9 Jul. 11, 2024

Related U.S. Application Data

(63) Continuation of application No. 17/960,597, filed on Oct. 5, 2022, now Pat. No. 11,901,556, which is a continuation of application No. 16/906,208, filed on Jun. 19, 2020, now Pat. No. 11,502,298.

(30) Foreign Application Priority Data

Jul. 19, 2019 (JP) ................................ 2019-133657
Apr. 7, 2020 (JP) ................................ 2020-069126

(51) Int. Cl.
*H01M 4/58* (2010.01)
*C01B 33/06* (2006.01)

(52) U.S. Cl.
CPC ............... *H01M 4/58* (2013.01); *C01B 33/06* (2013.01); *C01P 2002/72* (2013.01); *C01P 2002/77* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 6,423,286 | B1 | 7/2002 | Gryko |
| 8,968,929 | B2 | 3/2015 | Chan et al. |
| 11,075,372 | B2 | 7/2021 | Yoshida et al. |
| 11,088,367 | B2 | 8/2021 | Kosaka et al. |
| 2008/0226836 | A1 | 9/2008 | Nolas et al. |
| 2012/0021283 | A1 | 1/2012 | Chan et al. |
| 2013/0280609 | A1 | 10/2013 | Chan et al. |
| 2015/0243986 | A1 | 8/2015 | Negi et al. |
| 2015/0376016 | A1 | 12/2015 | Krishna et al. |
| 2015/0380724 | A1 | 12/2015 | Chan |
| 2016/0176716 | A1 | 6/2016 | Strobel et al. |

FOREIGN PATENT DOCUMENTS

| | | | |
|---|---|---|---|
| JP | 2013-018679 | A | 1/2013 |
| JP | 2015/179589 | A | 10/2015 |
| KR | 10-2015-0060802 | A | 6/2015 |
| WO | 2014/050100 | A1 | 4/2014 |
| WO | 2014/134350 | A1 | 9/2014 |

OTHER PUBLICATIONS

Wagner, Nicholas A. et al., "Electrochemical Cycling of Sodium-Filled Silicon Clathrate", ChemElectroChem (2014), vol. 1, pp. 347-353.
Sep. 22, 2021 Office Action issued in U.S. Appl. No. 16/906,208.
Krishna, Lakshmi et al. "Group IV clathrates: synthesis, optoelectronic properties, and photovoltaic." Proceedings of SPIE, 8981, Mar. 2014, pp. 898108-1-898108-11.
Li, Ying et al. "Type I Clathrates as Novel Silicon Anodes: An Electrochemical and Structural Investigation." Advanced Science, 2(6), May 2015, p. 1500057 (12 pages).
Boehme, Bodo et al. "Oxidation of M4Si4 (M=Na, K) to Clathrates by HCl or H2O." Journal of the American Chemical Society, 129(17), Apr. 2007, pp. 5348-5349.
Langer, Thorsten et al. "Electrochemical Lithiation of Silicon Clathrate-II." Journal of the Electrochemical Society, 159(8), Jul. 2012, p. A1318-A1322.
Oct. 14, 2020 Office Action issued in U.S. Appl. No. 16/594,094.
Apr. 9, 2021 Notice of Allowance issued in U.S. Appl. No. 16/594,094.
Mar. 2, 2022 Office Action Issued in U.S. Appl. No. 16/906,208.
Aug. 5, 2022 Notice of Allowance issued in U.S. Appl. No. 16/906,208.
Jun. 8, 2023 Office Action issued in U.S. Appl. No. 17/960,597.
Oct. 3, 2023 U.S. Notice of Allowance issued U.S. Appl. No. 18/104,991.
Oct. 3, 2023 Notice of Allowance issued in U.S. Appl. No. 17/960,597.

*Primary Examiner* — Tanisha Diggs

(57) ABSTRACT

A main object of the present disclosure is to provide an active material wherein an expansion upon intercalation of a metal ion such as a Li ion is suppressed. The present disclosure achieves the object by providing an active material comprising a silicon clathrate type crystal phase, and the active material includes a Na element, a Si element and a M element that is a metal element with an ion radius larger than the Si element, and a proportion of the M element to a total of the Si element and the M element is 0.1 atm % or more and 5 atm % or less.

1 Claim, 3 Drawing Sheets

Silicon clathrate I type

Silicon clathrate II type

Diamond type silicon

ACTIVE MATERIAL

ACTIVE MATERIAL

This application is a continuation application of U.S. patent application Ser. No. 17/960,597 filed Oct. 5, 2022, which in turn is a continuation application of U.S. patent application Ser. No. 16/906,208 filed Jun. 19, 2020, the entire disclosures of which are incorporated herein by reference.

TECHNICAL FIELD

The present disclosure relates to an active material wherein an expansion upon intercalation of a metal ion such as a Li ion is suppressed.

BACKGROUND ART

In recent years, the development of batteries has been actively undergone. For example, in automobile industries, the development of a battery to be utilized for an electronic vehicle or a hybrid vehicle has been advanced. Also, as an active material used in the battery, Si has been known.

Although it is not an invention related to a battery, Patent Literature 1 discloses a method for manufacturing a sodium-included type-II silicon-based clathrate, the method includes a positive pressure heat treatment step in which Si powder, Ge powder and Na are mixed and heated at a temperature of 650° C. or more to generate a compound including Si, Ge and Na; and a negative pressure heat treatment step in which the compound including Si, Ge and Na generated in the positive pressure heat treatment step is heated under a negative pressure of $10^{-2}$ Pa or less at a temperature of 300° C. or more and 450° C. or less for 2 hours or more and 72 hours or less.

Patent Literature 2 discloses an electrode active material including a clathrate compound containing a crystal lattice and a guest substance contained in the crystal lattice, and Patent Literature 3 discloses an electrode active material including the clathrate compound and a predetermined amount of a carbonaceous substance dispersed in the electrode active material. Patent Literatures 2 and 3 disclose a clathrate compound wherein the guest material including at least one kind selected from the group consisting of barium (Ba), calcium (Ca), and lithium (Li), and the crystal lattice including at least one kind selected from the group consisting of gallium (Ga), aluminum (Al), indium (In), silver (Ag), gold (Au), copper (Cu), nickel (Ni), and cobalt (Co), and at least one kind selected from the group consisting of silicon (Si) and tin (Sn).

CITATION LIST

Patent Literatures

Patent Literature 1: Japanese Patent Application Laid-Open (JP-A) No. 2013-018679
Patent Literature 2: WO2014/050100
Patent Literature 3: JP-A No. 2015-179589

SUMMARY OF DISCLOSURE

Technical Problem

The theoretical capacity of Si is high, which is advantageous in high energy condensation of a battery. On the other hand, the volume variation of Si during charge and discharge is large. Therefore, an active material with small volume variation during charge and discharge has been demanded. In particular, active material wherein an expansion upon intercalation of a metal ion such as a Li ion is suppressed, has been demanded.

The present disclosure has been made in view of the above circumstances, and a main object thereof is to provide an active material wherein an expansion upon intercalation of a metal ion such as a Li ion is suppressed.

Solution to Problem

In order to achieve the object, the present disclosure provides an active material comprising a silicon clathrate type crystal phase, and the active material includes a Na element, a Si element and a M element that is a metal element with an ion radius larger than the Si element, and a proportion of the M element to a total of the Si element and the M element is 0.1 atm % or more and 5 atm % or less.

According to the present disclosure, since the M element is included, an expansion upon intercalation of a metal ion may be suppressed in an active material.

In the disclosure, the M element may include at least one kind of Ge, Ga and Al.

In the disclosure, the M element may include at least Ge.

In the disclosure, the proportion of the M element may be 0.5 atm % or more and 3 atm % or less.

In the disclosure, the active material may have a composition represented by $Na_wMe_xM_{y+z}Si_{136-z}$, wherein Me is a metal element other than the Na element and the M element, w, x, y and z satisfy $0<w$, $0\leq x$, $0\leq y$, $x+y\leq w$, $0<w+x+y\leq 24$ and $0.136\leq z\leq 6.8$.

In the disclosure, the w may be 15 or less.

Advantageous Effects of Disclosure

The present disclosure exhibits an effect that an active material wherein an expansion upon intercalation of a metal ion is suppressed may be provided.

DESCRIPTION OF EMBODIMENTS

An active material in the present disclosure will be hereinafter described.

The active material in the present disclosure comprises a silicon clathrate type crystal phase, and the active material includes a Na element, a Si element and a M element that is a metal element with an ion radius larger than the Si element, and a proportion of the M element to a total of the Si element and the M element is 0.1 atm % or more and 5 atm % or less. Incidentally, in the following descriptions, a compound (active material) including a silicon clathrate type crystal phase may be described by referring to as a silicon clathrate compound in some cases.

According to the present disclosure, since the M element is included, an expansion upon intercalation of a metal ion may be suppressed in an active material.

Figure 1A:
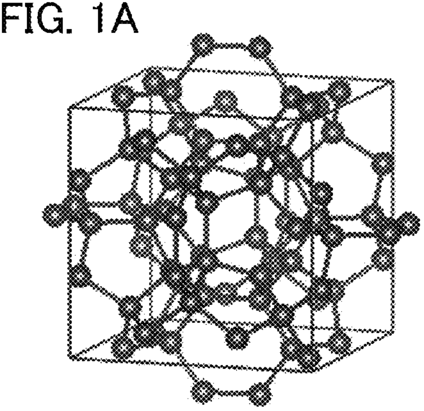
FIGS. 1A to 1C are explanatory drawings explaining an active material in the present disclosure.
Figure 1B:
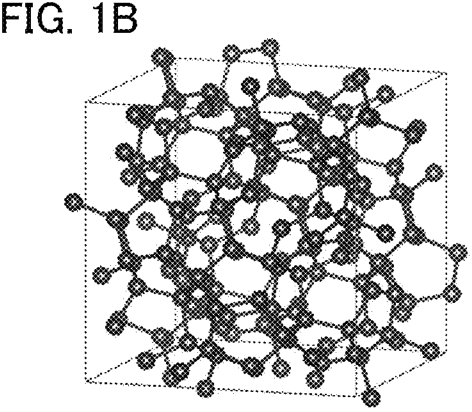
Figure 1C:
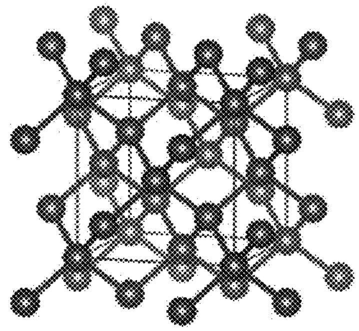

The framework atoms of a compound including the silicon clathrate type crystal phase has a cage-type structure, and a metal element such as a Li ion may be intercalated therein. Also, even when the metal ion is intercalated therein, the expansion amount is small, and the volume variation due to charge and discharge is small. Hereinafter, the explanation is made with reference to specific examples. Examples of the silicon clathrate type crystal phase may include silicon clathrate I type and II type crystal phase. In the silicon clathrate I type and II type crystal phase, as shown in FIG. 1A and FIG. 1B, a polyhedron including a pentagon or a hexagon is formed with a plural of Si elements. The polyhedron has a space within thereof that is capable of including a metal ion such as a Li ion. By the metal ion being intercalated into this space, the volume variation due to charge and discharge may be suppressed. Also, since the silicon clathrate I type and II type crystal phase has the space within thereof that is capable of including the metal ion, there is an advantage that the crystal structure is likely to be maintained although charged and discharged repeatedly. Meanwhile, a usual Si particle includes the crystal phase of a diamond-type. In the crystal phase of the diamond-type, as shown in FIG. 1C, a tetrahedron is formed with a plural of Si elements. Since the tetrahedron does not have a space within thereof that is capable of including the metal ion such as a Li ion, the volume variation due to charge and discharge is large. Therefore, an application of the silicon clathrate I type and II type to a battery has been considered.

The expansion amount of the compound including the silicon clathrate type crystal phase is small even when the metal ion is intercalated into the cage-type structure. However, when the intecalation amount of the metal ion is intended to increase from the viewpoint of improving the battery capacity, for example, the space amount of the cage-type structure may not be enough, and the expansion of the active material is concerned.

The accumulation of utmost research in view of the above circumstances have led the present inventors to acquire knowledge that the expansion upon intercalation of a metal ion may be further suppressed by including a M element that is a metal element with an ion radius larger than a Si element in a silicon clathrate compound including a Na element and a Si element. The reason therefor is presumed as described later. It is presumed that the size of the framework (the size of the cage-type structure) is increased since a part of the Si element constituting the cage-type structure is substituted by the M element, so that the size of the space capable of including the metal ion is increased. It is presumed that the expansion amount due to the matal ion being intercalated into the space may be further decreased as the result of the above.

Incidentally, Patent Literature 1 discloses a method for manufacturing a silicon clathrate compound including a silicon clathrate II type crystal phase including a Na element, a si element and a Ge element. However, Patent Literature 1 is silent about the function of the above described silicon clathrate compound as an active material for a battery.

Also, Patent Literatures 2 and 3 disclose using the silicon clathrate compound as the active material of a lithium ion battery. However, nether one of them discloses the silicon clathrate compound including a Na element. The active material in the present disclosure is hereinafter described in details.

1. Active Material

The active material in the present disclosure includes at least a Na element, a Si element and a M element. The M element is a metal element with an ion radius larger than the Si element. Here, since the ion radius of a tetravalent Si element is usually 0.40 Å, the ion radius of the M element is larger than 0.40 Å. The ion radius of the M element is, for example, more than 0.40 Å, may be 0.41 Å or more, may be more than 0.41 Å and may be 0.50 Å or more. Also, the ion radius of the M element may be, for example, 0.70 Å or less, and my be 0.65 Å or less. The ion radius of the M element is preferably close to the ion radius of the Si element.

The M element, for example, preferably belongs to a period or a group close to the Si element in the periodic table. The examples of the M element may include an Al element (ion radius: 0.535 Å), a Ga element (ion radius: 0.62 Å), and a Ge element (ion radius: 0.53 Å). In the present disclosure, the M element is preferably the Ga element or the Ge element, and more preferably the Ge element. Incidentally, the M element may be one kind of the above described element, and may include two kinds or more elements.

A proportion of the M element to a total of the Si element and the M element in the active material is, for example, 0.1 atm % or more, and may be 0.5 atm % or more. Also, the proportion is, for example, 5 atm % or less, may be 3 atm % or less, and may be 1 atm % or less. The proportion of the M element may be measured by, for example, an X-ray photoelectron spectroscopy (XPS). When the proportion of the M element is too high, the M element may not be dissolved in solid with Si and Si may not be substituted by M so that a clathrate structure may be formed between M-M.

The active material in the present disclosure preferably includes the M element as a framework atom. In this case, with respect to a silicon clathrate compound including the Si element only as the framework atom, the active material in the present disclosure may be deemed to be a clathrate compound wherein a part of the framework atom, the Si element, is substituted by the M element. Also, with respect to the Si element, the M element may be deemed to be a heteroelement. Also, the active material in the present disclosure may include the M element as the framework atom, and further as a guest atom.

The active material in the present disclosure includes a silicon clathrate type crystal phase. The examples of the silicon clathrate type crystal phase may include a silicon clathrate I type crystal phase and a silicon clathrate II type crystal phase. In the present disclosure, the active material preferably includes at least one crystal phase of the silicon clathrate I type and II type. Also, the active material may include the silicon clathrate I type or II type crystal phase as a main phase. Here, "including the silicon clathrate I type or II type crystal phase as a main phase" means that, among the peaks observe in an X-ray diffraction measurement, any one peak belonging to the silicon clathrate I type or II type crystal phase is the peak with the highest diffraction intensity. Also, the active material may include the silicon clathrate I type or II type crystal phase as a single phase. Meanwhile, the active material may include both of the silicon clathrate I type and II type crystal phase. Or otherwise, the active material may include silicon clathrate I type crystal phase and no silicon clathrate II type crystal phase, or the active material may include the silicon clathrate II type crystal phase and no silicon clathrate I type crystal phase.

The silicon clathrate I type crystal phase usually belongs to the space group (Pm-3n). Also, the silicon clathrate II type crystal phase usually belongs to the space group (Fd-3m). Incidentally, the silicon clathrate I type and II type crystal phase usually includes at least a Na element, a Si element and a M element that is a metal element with an ion radius larger than the Si element. Also, a Me element that is a metal element other than the Na element and the M element may or may not be included.

The silicon clathrate II type crystal phase has typical peaks at the positions of $2\Theta$=20.09°, 21.00°, 26.51°, 31.72°, 36.26°, and 53.01°, in an X-ray diffraction measurement using a CuKα ray. These peak positions respectively may be shifted in the range of ±1.00°, may be shifted in the range of ±0.50°, and may be shifted in the range of ±0.30°. Incidentally, when a metal ion such as a lithium ion is intercalated into the silicon clathrate II type crystal phase, for example, a peak shift may occur in some cases. Therefore, the XRD measurement is preferably carried out in a state where the metal ion is not intercalated.

The silicon clathrate I type crystal phase has typical peaks at the positions of $2\Theta$=19.44°, 21.32°, 30.33°, 31.60°, 32.82°, 36.29°, 52.39°, and 55.49°, in an X-ray diffraction measurement using a CuKα ray. These peak positions respectively may be shifted in the range of ±1.00°, may be shifted in the range of ±0.50°, and may be shifted in the range of ±0.30°. Incidentally, when a metal ion such as a lithium ion is intercalated into the silicon clathrate I type crystal phase, for example, a peak shift may occur in some cases. Similar to the silicon clathrate II type crystal phase, the XRD measurement is preferably carried out in a state where the metal ion is not intercalated.

Here, the diffraction intensity at the peak of $2\Theta$=26.51°±1.00° in the silicon clathrate II type crystal phase is regarded as $I_A$ and the diffraction intensity at the peak of $2\Theta$=32.82°±1.00° in silicon clathrate I type crystal phase is regarded as $I_B$. When the active material includes the silicon clathrate II type crystal phase, for example, the proportion of $I_B$ to $I_A$ (value of $I_B/I_A$) may be, for example, 1 or less, may be 0.8 or less, may be 0.6 or less, may be 0.4 or less, may be 0.2 or less, and may be 0.1 or less. Meanwhile, the value of $I_B/I_A$ may be 0, and may be more than 0. Also, when the active material includes the silicon clathrate I type crystal phase, the proportion of $I_A$ to $I_B$ (value of $I_A/I_B$) may be a value in a range similar to the value of the above described $I_B/I_A$.

The active material in the present disclosure may have a composition represented by, for example, $Na_wMe_xM_{y+z}Si_{136-z}$ wherein M is a metal element with an ion radius larger than the Si element, Me is a metal element other than the Na element and the M element, w, x, y and z satisfy 0<w, 0≤x, 0≤y, x+y≤w, 0<w+x+y≤24 and 0.136≤z≤6.8. In the composition, w is, for example, 15 or less, and may be 10 or less. Meanwhile, w is, for example, 1 or more, may be 3 or more, and may be 5 or more. When the value of w is in the above range, an expansion upon intercalation of a metal ion (carrier ion) may further be suppressed in an active material. The reason therefor is believed that the content of Na is low so that the size of the space for intercalation of the carrier ion such as a lithium ion is increased. The Me is not particularly limited as long as it is an element other than the Na element and the M element, that is, and element other than the Na element and has ion radius equal to or smaller than the Si element. Also, the active material in the present disclosure may have a composition represented by $Na_wMe_xM_{y+z}Si_{46-z}$ wherein M is a metal element with an ion radius larger than the Si element, Me is a metal element other than the Na element and the M element, w, x, y and z satisfy 0<w, 0≤x, 0≤y, x+y≤w, 0<w+x+y<8 and 0.046≤z≤2.3.

Examples of the shape of the active material in the present disclosure may include a granular shape. The average primary particle size of the active material is, for example, 50 nm or more, may be 100 nm or more, and may be 150 nm or more. Meanwhile, the average primary particle size of the active material is, for example, 3000 nm or less, may be 1500 nm or less, and may be 1000 nm or less. Also, the average secondary particle size of the active material is, for example, 1 μm or more, may be 2 μm or more, may be 5 μm or more, and may be 7 μm or more. Meanwhile, the average secondary particle size of the active material is, for example, 60 μm or less, and may be 40 μm or less. Incidentally, the average primary particle size and the average secondary particle size may be determined by observation with a SEM, for example. The number of the sample is preferably large; for example, 20 or more, may be 50 or more, and may be 100 or more. The average primary particle size and the average secondary particle size may be adjusted appropriately by, for example, appropriately changing the manufacturing conditions of the active material, and by carrying out a classifying treatment.

Incidentally, as shown in the later described Reference Example 5, by simulating a system including a P element (ion radius: 0.38 Å) with ion radius smaller compared to the Si element, instead of the M element in the silicon clathrate compound, it was suggested that the system including the P element is stable so that unlikely expanded, compared to the system including the Si element only as the framework atom. From this, it was suggested that the expansion of the active material upon intercalation of a metal ion may be suppressed, also when an element with ion radius slightly smaller compared to the Si element was included. Thus, the present disclosure may also provide an active material comprising a silicon clathrate type crystal phase, including a Na element, a Si element and a Mf element that is a non-metal element with an ion radius of 0.38 Å or more, and a proportion of the Mf element to a total of the Si element and the Mf element is 0.1 atm % or more and 5 atm % or less. The ion radius of the Mf element is, for example, 0.38 Å or more, and may be 0.40 Å or more. Also, the ion radius of the Mf element may be, for example, 0.70 Å or less, and may be 0.65 Å or less. Example of the Mf element may include P (phosphorus).

2. Method for for Producing Active Material

A method for producing an active material in the present disclosure is not particularly limited, and examples may include a method comprising a first heat treatment step of synthesizing a NaMSi compound including a Zintl phase by heat treating a mixture including Si simple substance, Na simple substance and M simple substance (metalic M), and a second heat treatment step of desorbing Na by heat treating the NaMSi compound under reduced pressure.

In the first heat treatment step, the proportion of the Si simple substance, the Na simple substance and the M simple substance is not particularly limited. To 100 mole parts of the total of the Si simple substance and the M simple substance, for example, the M simple substance is, for example, 0.1 mole parts or more, and may be 0.5 mole parts or more. Also, to 100 mole parts of the total of the Si simple substance and the M simple substance, the M simple substance is, for example, 5 mole parts or less, and may be 1 mole part or less. Also, to 1 mole part of the total of the Si simple substance and the M simple substance, the Na simple substance is, for example, 0.8 mole parts or more, may be 1 mole part or more, and may be 1.1 mole parts or more.

Meanwhile, to 1 mole part of the total of the Si simple substance and the M simple substance, the Na simple substance is, for example, 1.5 mole parts or less, may be 1.3 mole parts or less, and may be 1.2 mole parts or less.

Heat treatment temperature in the first heat treatment step is, for example, 500° C. or more and 1000° C. or less. Also, heat treatment time in the first heat treatment step is, for example, 1 hour or more and 50 hours or less. Particularly, a desired active material is likely to be obtained by carrying out the heat treatment under at least one condition of approximately 700° C. (for example, 650° C. or more and 750° C. or less) and approximately 20 hours (for example, 15 hours or more and 25 hours or less).

The pressure during the heat treatment in the second heat treatment step is, for example, 10 Pa or less, may be 1 Pa or less, and may be 0.1 Pa or less. Also, heat treatment temperature in the second heat treatment step is, for example, 300° C. or more, and may be 350° C. or more. Also, the heat treatment temperature is, for example, 650° C. or less. Also, the heat treatment time in the second heat treatment step is, for example, 30 minutes or more. Also, the heat treatment time is, for example, 25 hours or less, and may be 20 hours or less. The heat treatment conditions may be changed in the second heat treatment step. A desired active material is likely to be obtained by carrying out the heat treatment under, for example, at least one condition of approximately 340° C. (for example, 300° C. or more and 400° C. or less) and approximately 15 hours (for example, 12 hours or more and 18 hours or less), and then, carrying out the heat treatment under at least one condition of approximately 430° C. (for example, 400° C. or more and 500° C. or less) and approximately 6 hours (for example, 3 hours or more and 9 hours or less). Also, in the second heat treatment step wherein the heat treatment condition is varied, the NaMSi compound may be cooled once (for example, less than 340° C.) after the above described heat treatment at approximately 430° C. for approximately 6 hours, and then, the heat treatment may be carried out under at least one condition of approximately 430° C. (for example, 400° C. or more and 500° C. or less) and approximately 1 hour (for example, 30 minutes or more and 2 hours or less). By such a method, Na may further be desorbed from the NaMSi compound. It is presumed that the heat treatment temperature may be lowered since the cage in the present disclosure may be enlarged by including the M element, even though the Na with large atom radius is believed to be difficult to withdraw thereof from the cage-type structure. The active material in the present disclosure may be obtained by the second heat treatment step. Incidentally, the method for adsorbing Na is not limited to the heat treatment under vacuum.

The method for producing the active material in the present disclosure may include a crushing step of crushing the active material, as required. Examples of the crushing method may include a crushing method using one of a mortar, a ball milling, a jet milling, or a bead milling.

3. Application

The active material in the present disclosure is usually used for a battery. The active material in the present disclosure may be an anode active material, may be a cathode active material, and the former is preferable. The present disclosure may provide, for example, a battery including a cathode layer, an electrolyte layer, and an anode layer in this order in the thickness direction, wherein the anode layer includes the above described active material.

The anode layer is a layer including at least an anode active material. The anode layer may include just the silicon clathrate compound as the anode active material, and may further include an additional active material thereto. In the latter case, the proportion of the silicon clathrate compound in the entire anode active materials may be, for example, 50 weight % or more, may be 70 weight % or more, and may be 90 weight % or more. Also, the proportion of the anode active material in the anode layer is, for example, 20 weight % or more and 80 weight % or less.

Also, the anode layer may include at least one of the later described electrolyte, a conductive material, and a binder, as required. A known conductive material and binder for a battery may be used for the conductive material and the binder. The thickness of the anode layer is, for example, 0.1 μm or more and 1000 μm or less.

The cathode layer is a layer including at least a cathode active material. Also the cathode layer may include at least one of the later described electrolyte, a conductive material, and a binder, as required. The conductive material, the binder, the proportion of the cathode active material in the cathode layer, and the thickness of the cathode layer may be in the same contents as those described in the above described section of anode layer; thus, the descriptions herein are omitted.

The electrolyte layer is a layer that is formed between the cathode layer and the anode layer and that includes at least an electrolyte. The electrolyte may be a solid electrolyte, may be an electrolyte solution (liquid electrolyte), and may be a mixture of these. Among the above, the electrolyte is preferably a solid electrolyte. The all solid state battery including a solid electrolyte layer as the electrolyte layer preferably further includes a confining jig applying a confining pressure to the cathode layer, the electrolyte layer and the anode layer, along the thickness direction. If the anode active material expands, the confining pressure of the battery needs to be increased so that weight of the confining jig is increased. In the present disclosure, since the expansion of the active material may be suppressed, the increase of the confining pressure of the battery may be suppressed so that the weight of the confining jig may be reduced.

Typical examples of the solid electrolyte may include an inorganic solid electrolyte such as a sulfide solid electrolyte, an oxide solid electrolyte, a nitride solid electrolyte, and a halide solid electrolyte; and an organic polymer electrolyte such as a polymer electrolyte.

The battery in the present disclosure includes at least the above described anode layer, cathode layer, and electrolyte layer. Usually, it further includes a cathode current collector for collecting currents of the cathode layer, and an anode current collector for collecting currents of the anode layer. Also, the battery in the present disclosure may further include a confining jig applying a confining pressure to the cathode layer, the electrolyte layer and the anode layer, along the thickness direction. As the confining jig, a known jig may be used. The confining pressure is, for example 0.1 MPa or more, may be 1 MPa or more, and may be 5 MPa or more. Meanwhile, the confining pressure is, for example, 100 MPa or less, may be 50 MPa or less, and may be 20 MPa or less.

The battery in the present disclosure is usually a battery in which metal ions are conducted between the cathode layer and the anode layer. Examples of such a battery may include a lithium ion battery, a sodium ion battery, a potassium ion battery, a magnesium ion battery, and a calcium ion battery. Also, the battery in the present disclosure may be a liquid battery in which the electrolyte layer includes a liquid electrolyte, and may be an all solid state battery in which the electrolyte layer includes a solid electrolyte. Also, the battery in the present disclosure may be a primary battery and may be a secondary battery, but preferably a secondary battery among them, so as to be repeatedly charged and discharged, and useful as a car-mounted battery, for example.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Synthesis of Anode Active Material

Si simple substance (purity: 99.999%), Ge simple substance and Na simple substance (purity: 99.5%) were weighed and mixed so as to be Si simple substance:Ge simple substance:Na simple substance=0.999:0.001:1.1 in the molar ratio, added to a crucible made of boron nitride, and sealed under Ar atmosphere. In the mixture, the proportion of the Ge simple substance to the total of the Si simple substance and the Ge simple substance was 0.1 atm %. After that, a heat treatment was carried out under conditions of 700° C. for 20 hours. Thereby, clumped NaGeSi compound (compound including Zintl phase that is a NaSi compound substituted by a Ge element) was obtained. The obtained NaGeSi compound was crushed, and a Na desorption reaction was carried out by heat treating under vacuum (approximately 0.1 Pa) at 340° C. for 15 hours, and subsequently, heat treating at 430° C. for 6 hours. By the above described procedure, silicon clathrate powder was obtained. The obtained silicon clathrate powder was crushed in a mortar. By the above described procedure, an anode active material particle was obtained.

Production of Evaluation Battery

A dispersant (butyl butyrate), 0.3 g of a binder (a butyl butyrate solution containing 5 weight % of polyvinylidene fluoride), 2 g of cathode active material ($LiNi_{1/3}Co_{1/3}Mn_{1/3}O_2$) coated with lithium niobate, 0.3 g of a solid electrolyte ($Li_2S$—$P_2S_5$ based glass ceramic), 0.03 g of a conductive material (VGCF (vapor-grown carbon fiber)) were agitated in a polypropylene agitation mixer (TTM-1, from Sibata Scientific Technology LTD.) for 3 minutes, further stirred for 30 seconds by the ultrasonic dispersion apparatus, thereby produced a paste for a cathode layer. The paste for a cathode layer was pasted on a cathode current collector (aluminum foil) by a blade method using an applicator. Then, the resultant was dried at 100° C. for 30 minutes on a hot plate. Thereby, a cathode structure including a cathode layer and a cathode current collector was obtained.

A dispersant (butyl butyrate), 0.32 g of a binder (a butyl butyrate solution containing 5 weight % of polyvinylidene fluoride), 0.8 g of the above described anode active material particles, 0.6 g of a solid electrolyte ($Li_2S$—$P_2S_5$ based glass ceramic), 0.06 g of a conductive material (VGCF (vapor-grown carbon fiber)) were agitated in a polypropylene agitation mixer (TTM-1, from Sibata Scientific Technology LTD.) for 3 minutes, further stirred for 30 seconds by the ultrasonic dispersion apparatus, thereby produced a paste for an anode layer. The paste for an anode layer was pasted on an anode current collector (Cu foil) by a blade method using an applicator. Then, the resultant was dried at 100° C. for 30 minutes on a hot plate. Thereby, an anode structure including an anode layer and an anode current collector was obtained.

A dispersant (heptane), 0.05 g of a binder (a heptane solution containing 5 weight % of butadiene rubber), and 0.4 g of a solid electrolyte ($Li_2S$—$P_2S_5$ based glass ceramic including lithium iodide) were added to a container made of polypropylene, and stirred for 30 seconds by an ultrasonic dispersion apparatus. Then, the container made of polypropylene was agitated by an agitation mixer for 30 minutes, thereby produced a paste for a solid electrolyte layer. The paste for a solid electrolyte layer was pasted on an aluminum foil as a base material by a blade method using an applicator, and then, by drying the resultant at 100° C. for 30 minutes on a hot plate, a solid electrolyte layer was produced.

Next, the anode structure, the solid electrolyte layer, and the cathode structure were stacked in this order, the obtained stack was pressed under conditions of 130° C. and 200 MPa for 3 minutes, and an evaluation battery was obtained.

Examples 2 and 3

Anode active materials and evaluation batteries were obtained in the same manner as in Example 1, except that the molar ratio of the mixtures were adjusted so as the proportion of Ge to the total of Si and Ge were 1 atm % (Example 2) and 5 atm % (Example 3).

Examples 4 to 6

Anode active materials and evaluation batteries were obtained in the same manner as in Examples 1 to 3, except that Ga simple substance was used instead of the Ge simple substance.

Comparative Example 1

An anode active material and an evaluation battery were obtained in the same manner as in Example 1, except that the Si simple substance and the Na simple substance were weighed so as to be Si simple substance:Na simple substance=1:1.1 in molar ratio and the conditions of the heat treatment under vacuum were 450° C. for 6 hours.

Comparative Example 2

An anode active material and an evaluation battery were obtained in the same manner as in Comparative Example 1, except that the conditions of the heat treatment under vacuum were 450° C. for 5 hours.

Evaluation 1

XRD Measurement

Figure 2A:
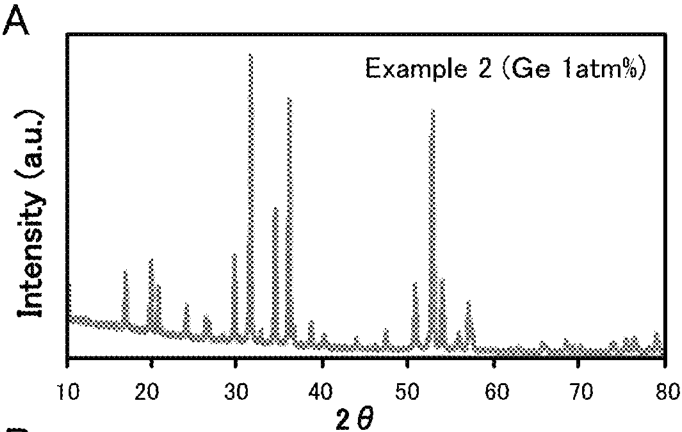
FIGS. 2A to 2D are the results of an XRD measurement for the active materials obtained in Examples 2 and 5 and Comparative Examples 1 and 2.
Figure 2B:
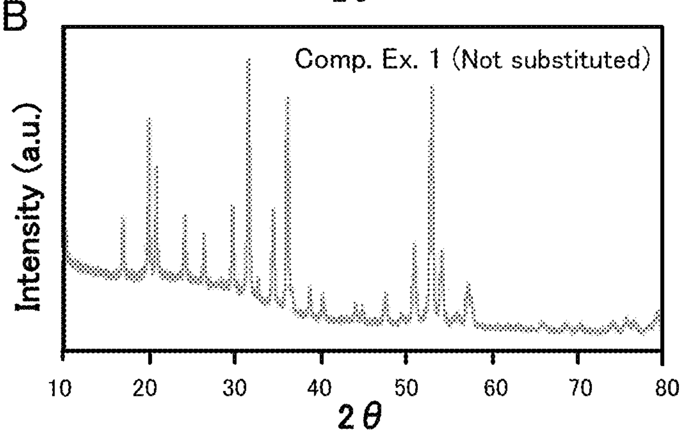

An X-ray diffraction (XRD) measurement using a CuKα ray was carried out for the anode active materials obtained in Examples 1 to 6 and Comparative Examples 1 and 2. The results in Examples 2 and 5 and Comparative Examples 1 and 2 are shown in FIGS. 2A and 2D. In Example 2 and Comparative Example 1, as shown in FIG. 2A and FIG. 2B, the typical peaks of the silicon clathrate II type crystal phase were confirmed as a main phase at positions in the vicinity of 2Θ=20.09°, 21.00°, 26.51°, 31.72°, 36.26°, and 53.01°, and the typical peaks of the silicon clathrate I type crystal phase (such as in the vicinity of 2Θ=32.82°) were also confirmed. Also, although not shown in the figures, the peaks similar to Example 2 were confirmed also in Examples 1 and 3.

Figure 2C:
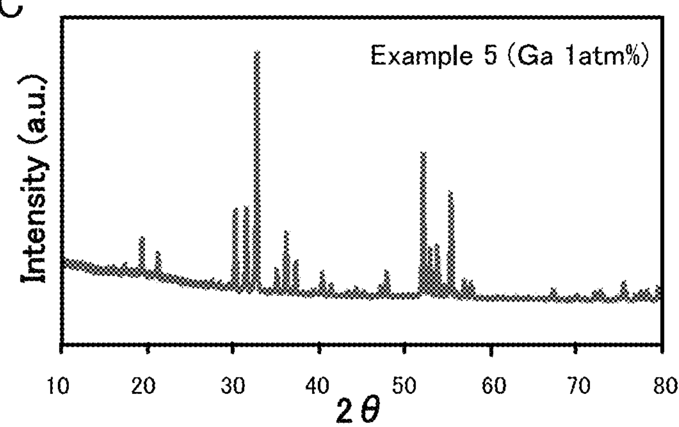
Figure 2D:
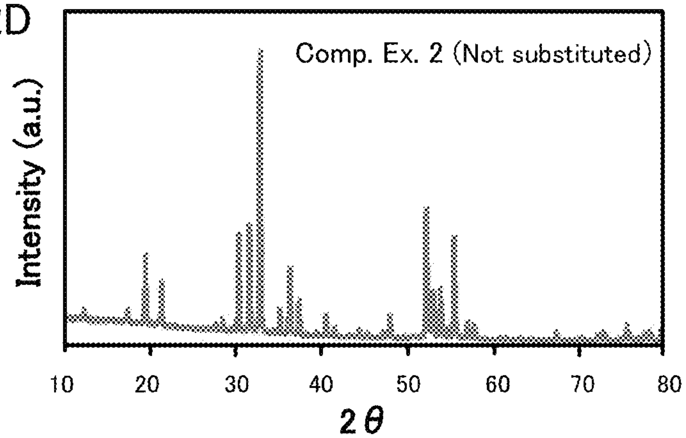

In Example 5 and Comparative Example 2, as shown in FIG. 2C and FIG. 2D, the typical peaks of the silicon clathrate I type crystal phase were confirmed in the vicinity of 2Θ=19.44°, 21.32°, 30.33°, 31.60°, 32.82°, 36.29°, 52.39°, and 55.49°. Also, although not shown in the figures, the peaks similar to Example 5 were confirmed also in Examples 4 and 6.

Evaluation by Lattice Constant

Figure 3A:
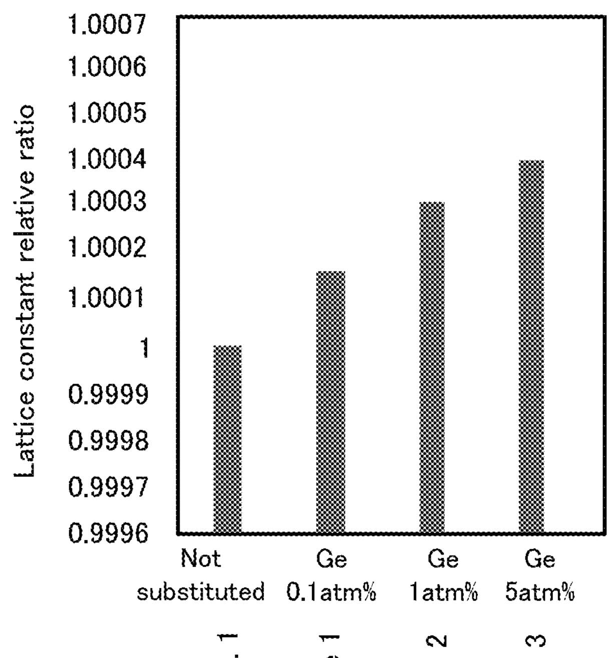
FIG. 3A and FIG. 3B are graphs showing the lattice constant ratios in Examples 1 to 6 and Comparative Examples 1 and 2.
Figure 3B:
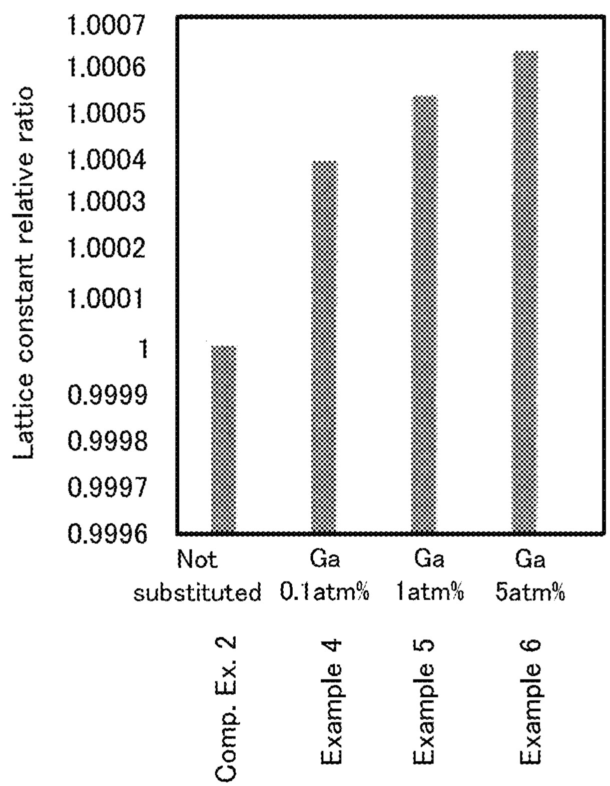

XRD patterns obtained in Examples 1 to 6 and Comparative Examples 1 and 2 were analyze by Rietveld analysis, and a lattice constant was determined. In Examples 1 to 3 and Comparative Example 1, the lattice constant was determined by analyzing the XRD patterns of II type crystal phase obtained as a main phase, among the XRD patterns, by Rietveld analysis. Also, in Examples 4 to 6 and Comparative Example 2, the lattice constant was determined by analyzing the XRD patterns of I type crystal phase by Rietveld analysis. The results are shown in FIG. 3A and FIG. 3B. FIG. 3A shows a graph of the ratios of the lattice constant in Examples 1 to 3, when the lattice constant in Comparative Example 1 is regarded as 1, and FIG. 3B shows a graph of the ratios of the lattice constant in Examples 4 to 6, when the lattice constant in Comparative Example 2 is regarded as 1. From the results shown in FIG. 3A and FIG. 3B, it was confirmed that the lattice constant was increased by the heteroelement substitution. From this, it was suggested that the size of the Si cage was enlarged, the density before the Li intercalation was lowered, and the expantion amount due to the Li intercalation was lowered by the heteroelement substitution.

Confining Pressure Evaluation

Using a confining jig capable of measuring a confining pressure with a load cell, the confining pressure was evaluated by confining the evaluation battery in a desiccator. The obtained evaluation battery was confined under pressure of 5 MPa, and was initially charged by energizing at constant current, 0.1 C, until voltage of 4.55 V. The confining pressure of the battery at that time was monitored, and was compared to the confining pressure when fully charged. The results are shown in Table 1. Incidentally, the confining pressure values in Examples 1 to 3 are the relative values when the result in Comparative Example 1 is regarded as 1.00, and the confining pressure values in Examples 4 to 6 are the relative values when the result in Comparative Example 2 is regarded as 1.00. It was confirmed that the confining pressure increase may be suppressed by the heteroelement substitution.

TABLE 1

| | Substitution element | Substitution amount (atm %) | Confining pressure |
|---|---|---|---|
| Example 1 | Ge | 0.1 | 0.95 |
| Example 2 | Ge | 1 | 0.82 |
| Example 3 | Ge | 5 | 0.89 |
| Comp. Ex. 1 | Not substituted | 0 | 1.00 |
| Example 4 | Ga | 0.1 | 0.96 |
| Example 5 | Ga | 1 | 0.93 |
| Example 6 | Ga | 5 | 0.96 |
| Comp. Ex. 2 | Not substituted | 0 | 1.00 |

Reference Examples 1 to 5

Using Nudged Elastic Band method, a generation energy and a Na diffusion barrier of a not substituted silicon clathrate compound and a silicon clathrate compound substituted by a heteroelement by 2.2 atm % were calculated. The results are shown in Table 2. It was inferred that the active material became less expandable when lithium was intercalated, since the diffusion barrier of the Na element was lowered when doped with the heteroelement. Also, it was suggested that the compound substituted by P was more stable compared to the not substituted compound.

TABLE 2

| | | Na diffusion barrier (kJ./mol) | Generation energy (kJ./mol) |
|---|---|---|---|
| Ref. Ex. 1 | Not substituted | 480.9 | −259.2 |
| Ref. Ex. 2 | Ga (2.2 atm %) | 238.3 | −257.2 |
| Ref. Ex. 3 | Ge (2.2 atm %) | 238.5 | −258.6 |
| Ref. Ex. 4 | Al (2.2 atm %) | 242.6 | −257.7 |
| Ref. Ex. 5 | P (2.2 atm %) | 236.6 | −259.5 |

Example 7

An anode active material and an evaluation battery were obtained in the same manner as in Example 1, except that, in Na desorption reaction, the heat treatment was carried out under vacuum (approximately 0.1 Pa) at 375° C. for 14 hours, and then, heat treated at 450° C. for 6 hours.

Example 8

An anode active material and an evaluation battery were obtained in the same manner as in Example 7, except that the molar ratio of the mixture was adjusted so as the proportion of Ge to the total of Si and Ge was 0.5 atm %.

Example 9

An anode active material and an evaluation battery were obtained in the same manner as in Example 7, except that the molar ratio of the mixture was adjusted so as the proportion of Ge to the total of Si and Ge was 1 atm %, and the heat treatment at 450° C. for 6 hours in the Na desorption reaction was carried out at 430° C. for 6 hours.

Example 10

An anode active material and an evaluation battery were obtained in the same manner as in Example 7, except that the molar ratio of the mixture was adjusted so as the proportion of Ge to the total of Si and Ge was 1 atm %.

Example 11

An anode active material and an evaluation battery were obtained in the same manner as in Example 10, except that, in Na desorption reaction, the anode active material was cooled after a heat treatment at 450° C. for 6 hours, and then, heat treated at 450° C. for 1 hour.

Example 12

An anode active material and an evaluation battery were obtained in the same manner as in Example 7, except that the molar ratio of the mixture was adjusted so as the proportion of Ge to the total of Si and Ge was 3 atm %, and in Na desorption reaction, a heat treatment was carried out under vacuum (approximately 0.1 Pa) at 340° C. for 14 hours, and then, heat treated at 450° C. for 6 hours.

Comparative Example 3

An anode active material and an evaluation battery were obtained in the same manner as in Comparative Example 1, except that the Na desorption reaction was carried out as described below. A heat treatment was carried out under vacuum (approximately 0.1 Pa) at 340° C. for 20 hours, and then, heat treated at 430° C. for 6 hours. The anode active material was cooled, and then, heat treated at 430° C. for 1 hour.

Comparative Example 4

An anode active material and an evaluation battery were obtained in the same manner as in Example 7, except that the molar ratio of the mixture was adjusted so as the proportion of Ge to the total of Si and Ge was 10 atm %, and the heat treatment in Na desorption reaction was just a heat treatment under vacuum (approximately 0.1 Pa) at 400° C. for 20 hours.

Evaluation 2

SEM-EDX Measurement

A SEM-EDX (scanning electron microscope-energy dispersion type X-ray spectroscope) measurement was carried out for the anode active materials obtained in Examples 7 to 12 and Comparative Examples 3 and 4 so as to measure Na/Si. Na/Si was calculated from the atomic ratio based on the signal intensity ratio of Na and Si by EDX analysis. Na amount was determined from Na/Si. The results are shown in Table 3.

Confining Pressure Evaluation

The confining pressure was evaluated in the same manner as in Evaluation 1. The results are shown in Table 3. Incidentally, the confining pressure was evaluated by the relative value when the result in Comparative Example 3 was regarded as 1.00.

TABLE 3

| | Substitution element | Substitution amount (atm %) | x in $NaxSi_{136}$ | Confining pressure |
|---|---|---|---|---|
| Example 7 | Ge | 0.1 | 11.7 | 0.98 |
| Example 8 | | 0.5 | 11.0 | 0.95 |
| Example 9 | | 1 | 12.1 | 0.93 |
| Example 10 | | 1 | 5.4 | 0.75 |
| Example 11 | | 1 | 2.0 | 0.70 |
| Example 12 | | 3 | 14.1 | 0.97 |

TABLE 3-continued

| | Substitution element | Substitution amount (atm %) | x in $NaxSi_{136}$ | Confining pressure |
|---|---|---|---|---|
| Comp. Ex. 3 | Not substituted | 0 | 13.3 | 1.00 |
| Comp. Ex. 4 | Ge | 10 | 21.9 | 1.23 |

From the substitution amount and the Na amount shown in Table 3, it was understood that the anode active material in Example 7 had a composition $Na_{11.7}Ge_{0.136}Si_{135.864}$. Incidentally, this composition corresponds to a composition wherein M is Ge, w is 11.7, x is 0, y is 0, and z is 0.136 in the composition $Na_wMe_xM_{y+z}Si_{136-z}$. Also, it was inferred that the anode active material in Example 1 (Ge substitution) wherein the element substitution amount was same as Example 7 and produced in the same manner as Example 7, also had a composition similar to Example 7. Also, it was inferred that the anode active material in Example 4 (Ga substitution) also had a composition similar to Example 8 except for the kind of the M element.

As Examples 1 to 6, it was confirmed that the confining pressure increase may be suppressed by the heteroelement substitution. Also, from Examples 9 to 11, it was confirmed that the less the Na amount was, the more the confining pressure increase was suppressed. The reason therefore was believed that the Na content was low so that the space wherein the Li ion was intercalated, was enlarged. Also, by determining the lattice constant of the anode active materials in Examples 7 to 12 and Comparative Example 3 by the XRD measurement in the same manner as in Evaluation 1, it was confirmed that the lattice constant was increased by the heteroelement substitution in every Example.

What is claimed is:

1. An automobile comprising an all solid state battery, wherein the all solid state battery comprises an anode layer, a cathode layer, and a solid electrolyte layer formed between the cathode layer and the anode layer, one of the anode layer and the cathode layer includes an active material comprising a silicon clathrate type crystal phase, the active material includes a Na element, a Si element and a Ge element, a proportion of the Ge element to a total of the Si element and the Ge element is 0.5 atm % or more and 1 atm % or less, an atomic part of the Na element to 136 atomic parts of the Si element is 2.0 parts or more and 5.4 parts or less, and such that the active material has a composition represented by $Na_wGe_zSi_{136-z}$, where $2.0 \leq w \leq 5.4$ and $0.68 \leq z \leq 1.36$.

* * * * *